Oct. 27, 1953 A. G. LAZZERY 2,657,365

VARIABLE INDUCTANCE AND MOUNTING MEANS THEREFOR

Filed March 31, 1950

Inventor
Angelo G. Lazzery
By H. W. Newton
Attorney

Patented Oct. 27, 1953

2,657,365

UNITED STATES PATENT OFFICE 2,657,365

VARIABLE INDUCTANCE AND MOUNTING MEANS THEREFOR

Angelo G. Lazzery, Oaklyn, N. J., assignor to Radio Corporation of America, a corporation of Delaware Application March 31, 1950, Serial No. 153,266

14 Claims. (Cl. 336—142)

This invention relates to means for mounting electrical inductances or coils. It relates in particular to mounting means for variably tuned coils generally wound on cylindrical coil forms or the like, and adapted for frequency band change tuning systems for television and high frequency receivers and the like.

More particularly, the invention comprises a mounting and tuning means for variably tunable inductance elements particularly adapted for use with a multiple band turret type tuning system for television receivers. Such a system is disclosed in a copending patent application of D. Mackey for improvements in Band Changing Systems for High Frequency Signal Tuners and the Like, filed June 29, 1949, Serial No. 101,965, and assigned to the same assignee as this application.

In the said copending application, a preferred type of turret tuner is disclosed which has a series of rotatably selectable planar-circuit-element segments. Each segment carries circuit elements for use in a particular frequency band or channel. Switch contacts are connected to the respective elements to effect the selection thereof. The segments are releasably affixed to the outer periphery of a drum type turret tuning structure which is rotatable by means of a band-change control shaft. For connecting the elements to an external circuit, fixed switch contacts are located external to and near the periphery of the drum for engaging the contacts on each segmental element, as it is rotated into a predetermined position. Circuit elements according to the copending application are preferably "printed" or photo-engraved upon the outer surface of the segments. The segments disclosed therein are in the form of thin planar insulating strips, and the inductance elements are in the form of flat spirals of small size and relatively few turns.

It has been found, however, that in some cases it is desirable to use an inductance of the cylindrical, single-layer solenoid type, in at least one circuit for each band change, which may be wound upon a relatively small cylindrical coil form, to replace certain of the printed circuit elements. This present invention, therefore, is primarily directed to an improved system and means for mounting an electrical inductance of that type. The improved mounting means is of a type particularly suited for mounting a variable inductance coil wound upon a hollow insulating form, and in a turret-type band-change structure. A base support, such as the above described segments, may be used for the mounting means.

There are many difficulties to be overcome in designing a coil and combined coil mounting structure for use with ultra high frequency circuits, which will be adaptable for commercial production. Low production cost must be attained without detriment to desired or necessary functional characteristics of the system. Relatively easy and simple mechanical and variable tuning adjustment must be provided, as well as short connection leads and contact means affording good terminal connections. There must also be provided a completed coil unit which is easily assembled and mounted. Furthermore, the construction must be simplified because assembly line labor cost of such a mounted coil assembly may be a limiting factor in the total output cost of such a device. In simplifying the construction, separate terminal connections and soldering lugs, requiring additional expenditure of materials and assembly time, must be eliminated or reduced to a minimum.

It is an object of this invention, therefore, to provide an improved tuning inductance and mounting assembly therefor particularly adapted for multiple band high frequency tuners, which has a minimum of parts and which may readily be assembled with a minimum of labor.

It is also an object of this invention, to provide an improved high frequency inductance or coil and mounting assembly therefor, which is readily adapted for high frequency circuits and systems.

It is another object of the present invention, to provide an improved tuning coil mounting arrangement which uses a minimum of parts and readily provides for tuning adjustment of the coil in a turret type tuner.

It is a further object of the invention to provide an adjustable tuning coil assembly and mounting means which may be assembled rapidly and easily and manufactured at low cost and yet which may function in every way as well or better than more expensive known devices of that type.

In accordance with the invention, there may be provided as a presently preferred embodiment, a tuning coil or inductive winding, wound upon a hollow preferably cylindrical form, and mounting means therefore. The coil assembly may be of the variable inductance type having a movable tuning core within the coil form. The mounting means and supporting structure itself primarily comprises a pair of L-shaped flat spring compression brackets adapted to be mounted in spaced relation on a plane surface with corresponding arms substantially parallel. A cupped impression is provided in each of the bracket arms referred to for engaging the outer surface of the coil form at each end. In this way with a compressional spring bias provided between the bracket arms, the latter serve to retain the ends of the coil form when the brackets are mounted in proper fixed space relationship. The bracket arms are further used as terminal lugs for connection to windings of the coil and to the turret tuner contact studs, when used in such tuners, all in accordance with the invention.

The features of the present invention, which are believed to be novel, are set forth with particularity in the appended claims. The invention itself, however, both as to its organization and manner of operation, together with further objects and advantages may best be understood by reference to the following description. This description is to be considered in connection with the accompanying drawing in which:

Figure 1:
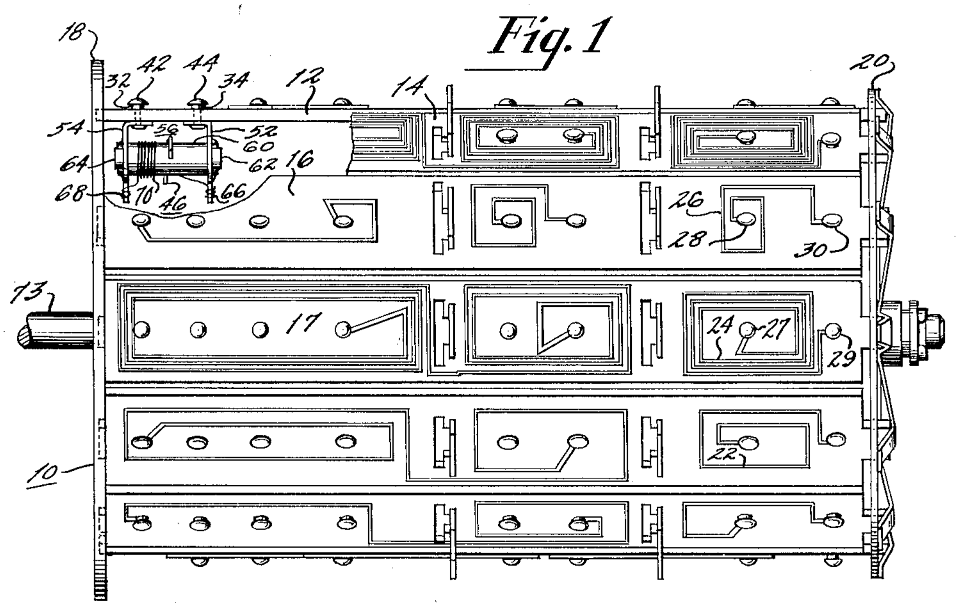
Figure 1 is a side view, partially broken away, of a multiple-circuit type band-switching tuner provided with a tuning coil or inductance and mounting means embodying the invention.

Referring to the drawing in general, like reference characters represent like parts throughout the respective views. Now referring in particular to Figure 1, there is shown a rotary drum type tuner 10 having a plurality of circuit elements mounted upon thin planar insulating segments or strips 12, 14, 16 and 17. These segments are mounted about the circumference of the drum 10 between two end supporting members 18 and 20.

Circuit elements such as coils 22, 24 and 26 are affixed to the outer portions of the strips by printing, photo-engraving or some like process. The particular manner of printing the circuit elements upon the strips is not a part of the present invention. The invention is, however, particularly adapted for use in combination with the described printed circuit elements.

External connections to the described circuit elements are made by means of switch contacts. These contacts are shown in the drawing as rivets 27, 28, 29 and 30 attaching the circuit elements 24 and 26 to the segments 16 and 17.

Shoulders 32 and 34 of these rivets (seen more clearly in the detailed view of Figure 3) may extend above the segmental strip 12 for supporting the rounded contact heads 42 and 44 of the rivets substantially away from the strip. This is done so that mating switch contact surfaces (not shown in the drawing) may register and make positive contact with the rivet heads without fouling any other portions of the rotatable drum periphery. As the specific contact does not concern the present invention, and the presently considered construction is believed to be clear from the drawing, further description is believed to be unnecessary.

There is shown in the broken away portion of the drum type turret tuner 10 of Figure 1, a coil and mounting structure in accordance with the present invention. The mounting means comprises a pair of brackets 52 and 54 each having two arms in a generally L-shaped relationship, one arm being longer than the other. These brackets are fastened by the shorter arms to the insulating strip 12 by means of switch contact rivets 42 and 44 of the type described. A coil assembly unit 56 is provided with a movable tuning core element or "slug" 72 which rides within a hollow insulated coil form 60. This form 60 may, as shown, be cylindrical in form, and is mounted between two specially designed open cups or sockets 62 and 64 impressed respectively in the longer bracket arms 66 and 68. The cup bases are apertured to allow entry of the threaded tuning slug 72 into the coil form 60.

An inductance or coil 70 is wound on the coil form 60 and is connected to terminal lugs formed by the extended tips 66 and 68 of the bracket arms. The coil in this manner is connected by means of the bracket arms 52 and 54 to the switch contact rivets 42 and 44. A positive contact to the external circuit is thereby made without the provision of further terminal connections or mounting elements.

The bracket fastener arms 52 and 54 are preferably made of any suitable resilient conductive material, such as aluminum, iron or brass. By this means, the brackets may be mounted in a fixed space relationship used to provide a spring bias for retention of the coil form 60. The bracket members 52 and 54 may then be sprung apart to receive the coil form 60. At this time the open cups or socket elements 62 and 64 will engage the ends of the coil form with a compressional resilient action.

A circumferential slot 48 (Figure 4) is provided in the coil form 60 to retain a generally C-shaped spring clip 46. This spring clip 46 has a shank portion 96 extending through the slot 48 to engage the threaded tuning slug 72. It further has a barbed portion 94 which bites into and firmly engages the opposite side of the coil form body 60. This core 72 is inserted within the coil form 60 as more clearly shown and described in considering Figure 3.

Figure 2:
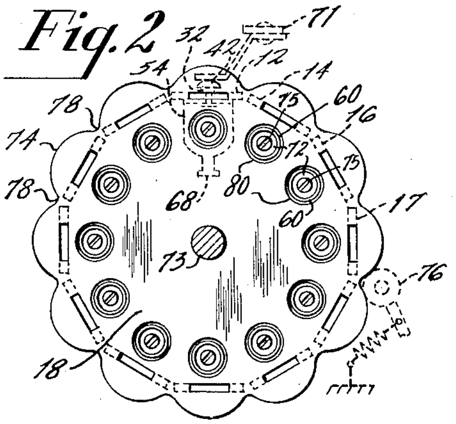
Figure 2 is a left end view of the tuner shown in Figure 1, and on a reduced scale, showing certain additional features of the invention.

Figure 2 shows in particular an end view of the drum end support member 18. The mounted bracket arm 54 is shown in dotted lines in the end view. A terminal lug 68 of the bracket arm which is mounted on the inside of segment 12, is extended radially toward the control shaft 73 at the center of the drum 10. By this means the external switch rivets 42 and 44 are connected to the coil by medium of the bracket arms 52 and 54.

A scalloped periphery 74 is provided on the end support member 18 for engagement with a ratcheting member (not shown in the drawing). The ratchet 76 (Figure 2) registers with the grooves 78 in the scalloped edge 74 to stop in succession each particular selected circuit element strip 12 in a fixed position. The fixed position corresponds to one particular switch contact line along the periphery of the drum structure as indicated in dotted outline 71 (Figure 2). By this means the coil assembly 56 may be stopped and the particular selected coil strip then may be connected to an external circuit by the rivet contacts 42.

Apertures 80 are shown in the end support member 18, through which the coil forms 60 and the tuning cores 72 are visible. The tuning cores 72 have slotted heads 75 as seen through the apertures 80. These heads 75 may be used for rotatably adjusting the relative position of the core with respect to the winding 70 on the coil form 60. A screw driver or like implement may be inserted through the aperture 80 to adjust the core. To allow free passage of a screw driver or a tuning slug 72, the hollow cup member 64 in the bracket arm 54 is provided with an apertured base.

Any type of tuning core may be used, but it is preferably one of a conductive material such as brass, copper or aluminum. Certain types of ferrites or high dielectric material may also be used satisfactorily. These core materials can be molded or machined to the proper shape. For engagement with the spring clip 46 a screw thread of suitable type is provided in the core body.

Figure 3:
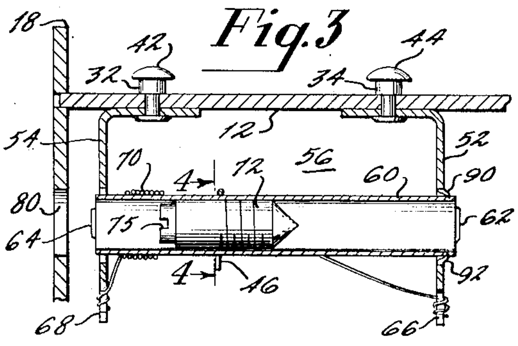
Figure 3 is an enlarged sectional view of a tuning inductance and mounting means as shown in Figure 1, showing details of construction in accordance with the invention.

The clip 46 and core body 72 are shown in Figure 3 in connection with the section view of the coil form 60. A portion of the core such as the slotted head 75 is located close to the coil 70 so that it may be moved to vary the coil tuning. As described above, the tuning may then be accomplished by means of changing the core position. Such tuning is preferably done by means of a screw driver of dielectric material which is inserted into the aperture 80.

Terminal lugs 66 and 68 are provided at the tips of the spring bracket arms 52 and 54 so that connections may be made directly from the coil 70 to the brackets. The brackets then serve as conductors and the rivets 42 and 44 which affix the brackets to the segment 12 accordingly serve as switching contacts in the manner described above.

The apertured base of the cups 62 in the bracket arms are of such size that the coil form ends are grasped externally thereby. The cups resiliently engage the ends of the coil form 60 which are seated therein by pressure exerted by the spring bracket arms 52 and 54. Spiked rim portions or projections 90 and 92 around the aperture are provided to engage the coil form body. Therefore, the bracket arms 54 and 56 may be squeezed or forced upon the ends of the coil form 60 so that the spikes 90 and 92 bite into and firmly hold the coil form 60. Rotary motion of the coil form 60 is by this means eliminated. As a result the core 72 may be rotated in making tuning adjustment as described without any danger of changing the position of the coil leads with respect to the terminal lugs 66 and 68. Any such change in lead length would materially affect the operation of any high frequency circuit, and would therefore be undesirable.

Figure 4:
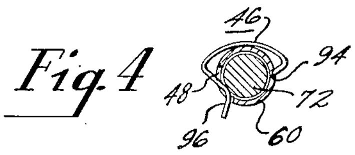
Figure 4 is a sectional view of a portion of the structure of Figure 3 taken on line 4—4 in the direction of the arrows.

Figure 4 shows the detailed construction of the spring clip 46 which retains the threads of the tuning core body 72. A spiked barb portion 94 at the head of the C-shaped clip bites into the coil form body 60 and prevents the clip 46 from rotating. A detent or shank portion 96 at the foot of the C-shaped clip engages the threads on the tuning core body 72 through the slot 48 in the coil form 60. Clips of this general type have been known in the art as indicated in Patent No. 2,149,848, E. Lampel. They have heretofore generally tended to rotate with the tuning slug. The barbed spike position according to the present invention, however, will prevent disengagement of the clip from the threaded slug and counteract any rotational tendency.

Figure 5:
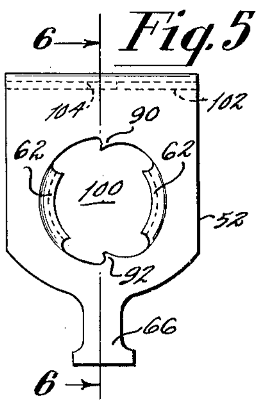
Figure 5 is a detailed end view of a further portion of the structure shown in Figure 3 and on a further enlarged scale; and, Figure 6 is a sectional side view of the bracket shown in Figure 5, taken on line 6—6 of Figure 5.

An end view of an unmounted bracket arm 52 is shown in Figure 5. An aperture 100 is provided in the bracket arm 52 which has a diameter slightly greater than the outside diameter of the coil form 60. The coil therefore has free movement through the aperture 100. There are barbed projections or spikes 90 and 92 on the rim of the aperture, however, which project inwardly on the rim. These barbed projections 90 and 92 are long enough to penetrate the insulating material at the ends of the coil form 60 when the cupped aperture 100 is forced externally thereover. The coil form then will not turn within the cups when a rotational torque is applied for example by the adjustment of the tuning core 72. The ends of the spikes are both directed toward approximately the same point on the periphery of the aperture 100. The barbs therefore are in the same general diametrical direction so that rotation will not be probable in either a clockwise or counterclockwise direction. Clockwise motion is resisted by spike 90 and counterclockwise motion is resisted by spike 92.

The cupped coil form retainer 62 is arranged to hold the end of the coil form at opposite sectors along the rim of the aperture 100, in this embodiment. This design permits the entire bracket to be stamped out of a single flat metal sheet. The inner diameter of these cup portions at the base are selected so that the cups fit externally over the ends of the coil form 60. As explained before, the spring bias between the bracket arms 52 and 54 will then retain the coil form in resilient engagement. The spikes are thereby forced to bit into the coil form body to prevent rotation. This results in a permanent mounting position of the coil assembly 56 having the above described functional advantages.

Figure 6:
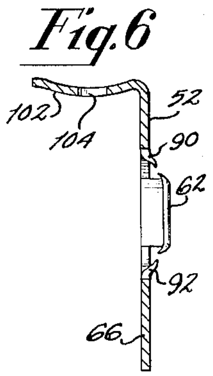

Figure 6 shows the L-shaped, cross-sectional form of an unmounted bracket 52. The shorter arm or base 102 of the bracket is bowed in the direction of the longer arm 52. The base 102 therefore has a downward curvature as shown in the drawing. The curved base 102 is made in this manner to supply a strong bias tension upon a rivet when the bracket is mounted. Thus the rivet 44 is held in firm electrical and mechanical contact with the bracket 52. Expansion or contraction with changes of temperature therefore will not affect any change in contact resistance. The curved base further tends to distort the outer end 66 of the L-shaped bracket 52 inwardly or in the direction of the coil form 60 as shown in the drawing. There is therefore imparted from the brackets 52 and 54 a stronger compressional resilient action tending to retain the coil form 60 therebetween.

An aperture 104 is provided in the center of curvature of the base arm 102 for registration of a rivet. This aperture may have serrations on the bowed side to keep the rivet head from rotating and to provide a more certain electrical contact surface.

There is therefore provided in accordance with the above described invention an improved coil and mounting means therefor. One feature of the invention pertains to the simplicity of assembling the entire system. A coil form is merely snapped between two L-shaped bracket spring retainers riveted on a mounting segment or plate as part of the conductive circuit of the apparatus.

A further feature of the invention pertains to the provision of L-shaped retainer brackets mounted on a strip by means of rivets which provide switch contacts. Also, the brackets are shaped to serve in addition as terminal means. These features particularly have adapted the inthe threaded tuning core within said coil form, system such as the type described.

It will be recognized from the foregoing description that the construction of an inductance unit according to the invention and its mode of operation may be varied to provide reasonable modifications. However, these modifications may not necessarily depart from the scope or the spirit of the invention, which is defined in the appended claims.

What is claimed is:

1. A multiple band, high frequency tuning unit, comprising in combination, a mounting and support means, a hollow elongated coil form, said first named means including a pair of L-shaped spaced bracket members each having two arms of unequal length, means providing an aperture in the longer arm of each bracket of a diameter slightly greater than that of said coil form, a cupped retainer portion about the rim of said aperture resiliently engaging the ends of said coil form, and a barbed projection extending into said first named aperture from the rim thereof and physically engaging the coil form and preventing rotation thereof.

2. A tuning unit as defined in claim 1 wherein two opposed barbed projections are provided in said aperture in spaced relation, and wherein said bracket members are connected with and supported by switching contact means for said unit.

3. A tuning unit as defined in claim 2, wherein the shorter arm of each bracket member is connected with said contact means, and wherein said shorter arm is bowed in the direction of the longer arm, to thereby provide a spring bias and a resulting positive contact with said contact means.

4. A support means as defined in claim 3 wherein the end of the longer arm of said bracket member is shaped to form a terminal lug connection.

5. A tuning coil assembly for multiple band tuners and the like, comprising in combination, a pair of end supporting bracket members having arms and socket elements located in said arms, said socket elements each having an apertured base, a coil form resiliently gripped between said members and having a cross sectional dimension approximately that of said socket elements whereby the ends of the coil mounting form registers within said socket elements, barbed means positioned in and around the rims of said socket elements and engaging said coil form, thereby preventing rotation of said coil in said socket elements, and means including contact elements for said assembly connected with and supporting said bracket members in a spaced relationship.

6. A tuning coil assembly as defined in claim 5 wherein said supporting means for the bracket members further includes a thin planar insulating segment, and said contact elements comprise a pair of rivets extending through said bracket members and said insulating segment.

7. A tuning coil assembly as defined in claim 5, wherein said coil form is provided with a circumferential slot, an internal threaded tuning core, and a spring clip having a shank portion engaging said threaded core through said slot and having a barb portion firmly engaging said coil form.

8. A multiple band, high frequency tuning unit, comprising in combination, a mounting and support means, a hollow elongated coil form, said first named means including a pair of bracket members, means providing an aperture in each bracket of a diameter slightly greater than that of said coil form, a cupped retainer portion about the rim of said aperture resiliently engaging the ends of said coil form, a barbed projection extending into said first named aperture from the rim thereof and physically engaging the coil form and preventing rotation thereof, an inductive winding on said coil form, a threaded tuning core in said coil form, means engaging and retaining the threaded tuning core within said coil form, said coil form having a circumferential slot therein, and said retaining means comprising a generally C-shaped spring clip having a shank portion engaging said threaded core through the slot in said coil form and having a barb portion engaging said coil form.

9. Means for retaining a coil form comprising, a bracket member having a pair of resilient arms of unequal length, means providing an aperture in the longer arm of said bracket of a diameter slightly greater than that of said coil form, a socket element about the rim of said aperture for engaging the ends of said coil form and a barbed projection extending inwardly from the rim of said aperture for physically engaging the coil form to prevent rotation thereof.

10. A means as defined in claim 9 wherein the end of the longer arm is shaped to provide a terminal lug connection.

11. In a multiple band radio and television tuner the combination of a thin planar insulating strip segment, circuit elements affixed to said segment, switch contacts firmly attached to said segment and connected to said circuit elements, and a coil and mounting assembly comprising a pair of flat spring bracket members having cup shaped sockets, said sockets having apertured bases, a hollow coil form of a fixed length and of approximately the same diameter as said sockets, means mounting said brackets on said segment in a fixed space relationship slightly shorter than said fixed form length, said means including a contact rivet for each bracket having a head providing a switch contact, terminal lug means integral with said bracket, and a tuning coil on said coil form having connections with said terminal lug means.

12. The combination with a turret-type tuner for radio and television apparatus and the like, having segmental tuning coil supporting elements of a coil and mounting structure for said coil, comprising a pair of coil end supporting bracket members mounted in fixed spaced relationship on each of a certain number of said elements, each bracket member having a cup shaped socket therein with an aperture in the base thereof, said apertures being arranged along a fixed axis and said sockets extending outwardly on opposite sides of said pair of coil end supporting bracket members, a tunable coil having a cylindrical coil form mounted between said bracket members in engagement with said sockets, said coil form having a longitudinal dimension slightly greater than said fixed spaced relationship and having a cross section approximately that of the diameter of said sockets, whereby said sockets engage the ends of said coil form with a compressional resilient action, barbed projections extending inwardly from said sockets for engaging said coil form to prevent rotation thereof, switching contact studs connected with and locking said bracket members to said segmental elements, and said tuning coil being electrically connected with said contact studs through said bracket members.

13. A combination as defined in claim 12 wherein said tunable coil is provided with a movable tuning core within said form and said coil supporting elements are apertured to provide for externally moving said core for effecting tuning of said tunable coil.

14. In a multiple band switching device for radio and television tuning systems and the like, the combination of a variable inductance coil adapted to be connected with a tunable circuit for determining a predetermined frequency response band, and support means for said coil, said support means comprising a pair of electrically conductive spaced bracket members, a coil form for said coil resiliently held and fixed between said bracket members, terminals on said bracket members electrically connected to said coil, a movable insulating inductance coil support means for said device, and electrically conductive switch contact means firmly fixing said brackets to said insulating support.

ANGELO G. LAZZERY.

References Cited in the file of this patent

UNITED STATES PATENTS

| Number | Name | Date |
|---|---|---|
| D. 21,627 | Meeker | June 21, 1892 |
| 2,149,848 | Lampel | Mar. 7, 1939 |
| 2,496,183 | Thias et al. | July 23, 1948 |
| 2,545,681 | Zepp et al. | Mar. 20, 1951 |

FOREIGN PATENTS

| Number | Country | Date |
|---|---|---|
| 615,106 | Great Britain | Jan. 3, 1949 |